Jan. 12, 1937.    E. L. THEARLE    2,067,803
VIBRATION RESPONSIVE DEVICE
Original Filed Sept. 1, 1934
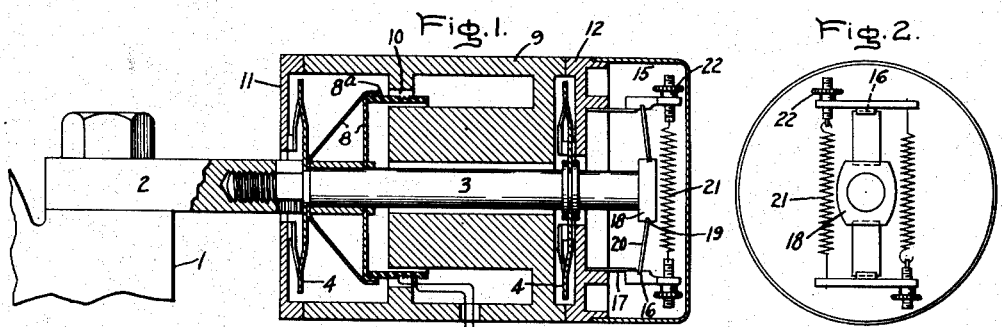
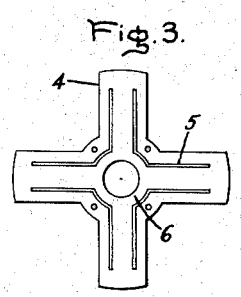
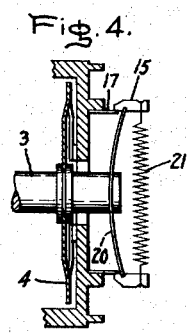
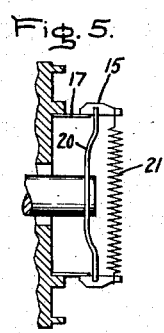
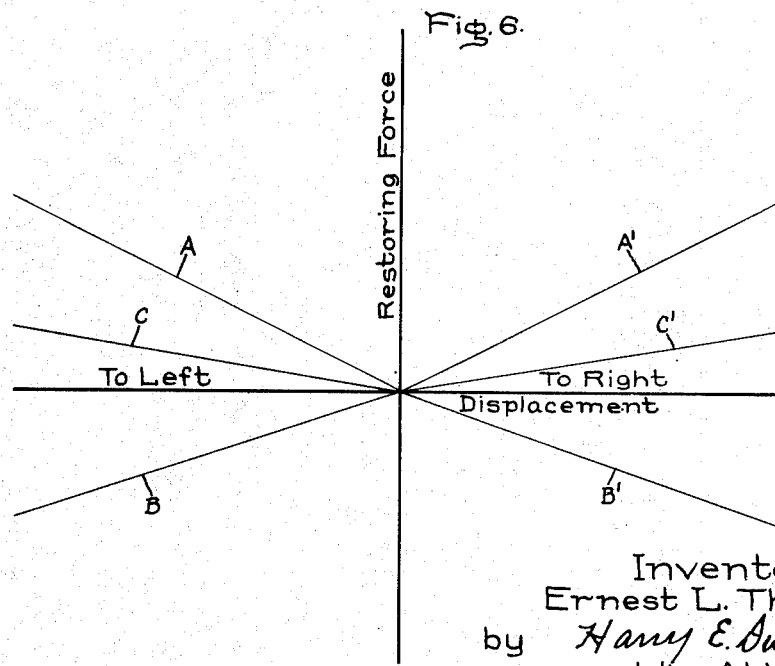
Inventor:
Ernest L. Thearle,
by Harry E. Dunham
His Attorney Patented Jan. 12, 1937

2,067,803

UNITED STATES PATENT OFFICE 2,067,803

VIBRATION RESPONSIVE DEVICE

Ernest L. Thearle, Schenectady, N. Y., assignor to General Electric Company, a corporation of New York Original application September 1, 1934, Serial No. 742,417. Divided and this application April 28, 1936, Serial No. 76,795

6 Claims. (Cl. 177—351)

The present invention relates to an improved vibration responsive device, and more particularly to an electromagnetic generator for translating mechanical vibrations into an electrical voltage.

This application is a division of my copending application, Serial No. 742,417, filed September 1, 1934, which in turn is a division of an earlier application Serial No. 656,878, filed by me on February 15, 1933, for a Method of and apparatus for dynamically balancing rotatable bodies.

It is an object of the invention to produce an electromagnetic generator which is adapted for use in determining the unbalance of rotating machines and is highly sensitive to vibrations of relatively low frequency.

It is a further object to provide a generator of the above character which is sufficiently rugged to insure long life and good accuracy, even under the adverse conditions encountered in field balancing.

The features of my machine which I consider to be novel will be pointed out with particularity in the appended claims. The invention itself, however, both as to its organization and the method of operation, together with further objects and advantages thereof, will best be understood by reference to the following specification taken in connection with the accompanying drawing, in which Fig. 1 represents a longitudinal sectional view of an electromagnetic generator constructed in accordance with the principles of my invention; Fig. 2 is an end-view of the generator; Fig. 3 is a view in front elevation of one of the spring diaphragms used in the generator; Figs. 4 and 5 illustrate modified forms of the spring means of Fig. 2 shown in different operative positions, and Fig. 6 comprises a graphical representation useful in explaining my invention.

Referring particularly to Fig. 1, I designates a mounting block provided in connection with the test body whose vibrations are to be detected and analyzed. The generator as a whole is solidly connected to the mounting block I by means of a bracket 2 bolted thereto. As an extension of the attachment bracket I have shown a cylindrical rod or shaft 3 screw-threaded into the end of the bracket.

Mounted on the rod and in spaced relation to one another are two spring diaphragms 4 which are shown in front elevation in Fig. 3. As illustrated, the diaphragms each comprise a multifoliate piece of sheet metal having a central aperture therein and provided with radially extending slots 5 so formed as to leave a resiliently movable central section 6 flexibly secured to the remainder of the diaphragm structure. The diaphragms are slipped on to the shaft 3 and fixedly secured in place so as to be held at right angles to the shaft axis.

Coaxial with the shaft 3, I provide a member 9 having sufficient inertia so that its tendency is to stand still in space when subjected to force impulses of any except very low frequencies. The inertia member comprises a permanent field magnet which is of annular form and which includes an outer and an inner part with an annular air gap 10 between them. Rigidly mounted on the shaft 3 and supported therefrom by a spider 8, I provide an armature coil 8a of generally cylindrical form. This is of such size and is so positioned as to lie within the magnet gap 10 but out of contact with parts of the field structure. This coil may suitably comprise a number of turns of magnet wire and is provided with terminal conductors 10a adapted to be secured to an external circuit capable of analyzing the electromotive force developed in the coil. It will readily be understood that the electromotive force actually developed at any instant will be proportional to the velocity of displacement existing between the coil and the field structure.

The interior spaces defined by the configuration of the inertia member 9 are substantially enclosed by end-plates 11 and 12 of non-magnetic material. The magnet structure as a whole is maintained in coaxial alinement with the shaft 3 by means of the diaphragms 4, the outer parts of which are attached to the inner surfaces of the end-plates 11 and 12 respectively. It should be understood that in accordance with my invention the diaphragms 4 are sufficiently rigid in a radial direction to prevent any substantial displacement in that direction of the inertia member with respect to the shaft. By this arrangement the field magnet and the armature coil can vibrate back and forth axially with respect to each other due to the inherent flexibility of the diaphragms in response to vibrations of the mounting block I but are restrained against radial movement.

It is evident, however, that if the diaphragms 4 are to have considerable strength and stiffness in a radial direction, they must also have some stiffness axially, or some resistance to axial deflection. This results in such a high natural resonant frequency of axial vibration as to destroy or tend to destroy the usefulness of the device at low balancing speeds. To avoid this difficulty my invention provides means for at least partially balancing the axial stiffness of the diaphragms, such means acting in the fashion of a negative spring. That is to say, precisely contrary to usual spring action, the balancing agency which I contemplate using exerts a displacing rather than a restoring force, which force increases with increasing relative displacement of the field magnet and the armature. Furthermore, the force developed is proportional to the amount of displacement.

A spring mechanism which satisfies these conditions is shown at the extreme right of Fig 1 and in detail in Fig. 2. In the construction illustrated the two blocks 15, having opposed V-shaped notches 16, are secured by thin flat elastic strips or springs 17 to the field structure of the generator. Mounted on the shaft 3 is a block 18 which has a pair of V-shaped notches 19 in its opposed faces. Situated between the blocks and providing what is in effect a toggle connection between the shaft and the inertia member I provide stiff radially alined struts 20 having ground knife edges at their ends which are seated in the V-shaped notches.

The outer blocks 15 are pulled toward each other by adjustable tension springs 21, of which two are provided, so that if the shaft 3 is displaced in one direction, say to the left, the struts 20 will tilt in such a manner as to exert components of force on the shaft tending to displace it still further in the same direction. The magnitude of the force exerted can be adjusted by tightening the nuts 22 so as to decrease to any desired extent the effective resistance to displacement caused by the resilient diaphragms 4, and thereby the natural frequency of axial vibration of the generator may be made as low as is required.

In Figs. 4 and 5, are illustrated modified forms of the spring compensating means. In the form shown in Fig. 4 the struts 20 are elastic and are fixedly secured to the shaft 3 while their outer ends fit into cooperating notches in the blocks 15, as previously described. In the further alternative modification shown in Fig. 5, the outer ends of the struts 20 are also rigidly connected to the blocks 15.

The principle of operation of my improved vibration responsive device may be conveniently explained in connection with Fig. 6. In this figure the line A represents graphically the relation between the restoring force exerted by the spring diaphragms 4 of Fig. 1 and the axial displacement between the armature coil and the inertia member. It will be observed that the restoring force exerted is directly proportional to the amount of displacement and is a function of the slope of the line A. The magnitude of the slope in a positive sense determines directly the natural frequency of displacement of the armature coil and field magnet. As previously explained, in using a diaphragm of adequate mechanical strength this frequency is so high as to impair the utility of the generator in detecting low frequency vibrations.

My invention provides for diminishing the natural frequency of the spring system without decreasing its mechanical strength by providing a spring means of negative restoring force which tends to offset the positive force due to the resilience of the diaphragms 4. The force displacement characteristic of such a means, which is of course the toggle connection described with reference to Figs. 1 and 2, is illustrated by the line B. The negative slope of this line indicates a tendency to favor rather than to oppose an increase in displacement and thus partially to offset the restoring force of the diaphragms 4.

The ultimate effect of this action is to decrease the total effective resistance to axial displacement of the shaft and inertia member to a value determined by the slope of the line C. Since the slope of this line, which comprises the resultant of the forces represented by the lines A and B, is small, it will be clear that the natural frequency of the composite spring structure may be sufficiently low to permit detection of vibrations in any desired range.

While I have described my invention in connection with an electromagnetic generator, it is equally applicable to other types of apparatus for translating mechanical vibrations into other forms of energy and particularly where such apparatus comprises a movable member arranged to receive or deliver the mechanical vibrations, a cooperative inertia member, and means associated with said members for effecting the energy translation in response to relative displacement between them. I, therefore, aim by the appended claims to cover all such modifications as fall within the true spirit and scope of my invention.

What I claim as new and desire to secure by Letters Patent of the United States, is:

1. Apparatus for translating mechanical vibrations into an electrical voltage comprising an inertia member including a magnet, an armature coil arranged in the field of said magnet and a flexible connection between said magnet and said armature coil preventing relative displacement therebetween except along a single axis, said connection comprising a first resilient means which resists displacement of the magnet and armature coil along said axis with a force which increases substantially in proportion to the displacement and a second resilient means which favors displacement along said axis with a force which also increases substantially in proportion to the displacement but is at all times less than said first-named force.

2. Apparatus for translating mechanical vibrations into an electrical voltage comprising a rigid shaft, an inertia member including a magnet having an annular air gap substantially coaxial with said shaft, an armature coil arranged in said air gap and being rigidly secured to said shaft, a pair of radially stiff diaphragms perpendicularly mounted on said shaft and supporting said inertia member in coaxial alinement therewith, said diaphragms being formed to resiliently resist axial displacement of said shaft and said inertia member, and an additional resilient means having negative spring characteristics interconnected between said shaft and said inertia member, said means being adapted to oppose the action of said diaphragms thereby to decrease the total effective resistance to axial displacement of the shaft and inertia member.

3. Apparatus for translating mechanical vibrations into an electrical voltage comprising an inertia member including a magnet, a member supporting an armature coil in the field of said magnet, and a connection between said members preventing relative displacement therebetween except along a single axis, said connection comprising a resilient element which resists relative displacement of the members along said axis with a force which increases substantially linearly with the displacement, and a toggle connection between said members, adapted to decrease their total effective resistance to relative displacement, said last-named connection comprising a plurality of radial struts and means exerting radial compression on said struts.

4. Apparatus for translating mechanical vibrations into an electrical voltage comprising a shaft, an inertia member including a magnet having an anular air gap coaxial with said shaft, an armature coil arranged in said air gap and secured to said shaft, a connection between said shaft and said inertia member for maintaining the same in coaxial alinement, said connection comprising a pair of radially stiff metal diaphragms each having slots therein providing a movable central section secured to said shaft and resiliently resisting axial displacement between said shaft and said inertia member, and additional means interconnected between said shaft and said inertia member to decrease their total effective resistance to axial displacement, said means comprising a negative spring member adapted to favor axial displacement of the shaft and inertia member.

5. Apparatus for translating mechanical vibrations into an electrical voltage comprising a shaft, an inertia member including a magnet having an annular air gap coaxial with said shaft, an armature coil arranged in said air gap and secured to said shaft, a pair of radially stiff diaphragms perpendicularly mounted on said shaft and supporting said inertia member in coaxial alinement therewith, said diaphragms being formed to resiliently resist axial displacement of said shaft and said inertia member, and means for decreasing the total effective resistance to displacement of the shaft and inertia member, said means comprising a plurality of radially alined struts providing a toggle connection between said shaft and said inertia member and spring means exerting radial compression on said struts.

6. Apparatus for translating mechanical vibrations into another form of energy comprising a movable member arranged to receive or deliver said mechanical vibrations, an inertia member, means operatively associated with said members for effecting said energy translation in response to relative displacement between the members, and a flexible connection between said movable member and said inertia member permitting relative displacement therebetween, said connection comprising a first resilient means which resists relative displacement of the members with a force which increases substantially in proportion to the displacement and a second resilient means which favors relative displacement of the members with a force which increases substantially in proportion to the displacement but is at all times less than said first-named force.

ERNEST L. THEARLE.